(12) United States Patent
Liang et al.

(10) Patent No.: US 8,656,488 B2
(45) Date of Patent: Feb. 18, 2014

(54) METHOD AND APPARATUS FOR SECURING A COMPUTER NETWORK BY MULTI-LAYER PROTOCOL SCANNING

(75) Inventors: Yung-Chang Liang, Cupertino, CA (US); Said Kaki, Pasadena, CA (US); Yi-Fen Chen, Pasadena, CA (US)

(73) Assignee: Trend Micro Incorporated, Tokyo (JP)

( * ) Notice: Subject to any disclaimer, the term of this patent is extended or adjusted under 35 U.S.C. 154(b) by 2414 days.

(21) Appl. No.: 11/366,305

(22) Filed: Mar. 1, 2006

(65) Prior Publication Data

US 2006/0206936 A1  Sep. 14, 2006

Related U.S. Application Data

(60) Provisional application No. 60/660,751, filed on Mar. 11, 2005.

(51) Int. Cl.
*G06F 11/00* (2006.01)
(52) U.S. Cl.
USPC .............................. 726/22; 713/189
(58) Field of Classification Search
USPC .............. 726/22–25, 3, 13, 14; 713/151, 152, 713/154
See application file for complete search history.

(56) References Cited

U.S. PATENT DOCUMENTS

| | | | |
|---|---|---|---|
| 2003/0014662 A1* | 1/2003 | Gupta et al. | 713/200 |
| 2003/0145226 A1* | 7/2003 | Bruton et al. | 713/201 |
| 2003/0204719 A1 | 10/2003 | Ben-Itzhak | |
| 2004/0059942 A1 | 3/2004 | Xie | |
| 2005/0108518 A1* | 5/2005 | Pandya | 713/151 |
| 2005/0204151 A1 | 9/2005 | Xie | |
| 2005/0229237 A1 | 10/2005 | Xie et al. | |
| 2006/0036728 A1 | 2/2006 | Xie | |

OTHER PUBLICATIONS

International Search Report for Application No. PCT/US2006/07612 (2 sheets).

\* cited by examiner

*Primary Examiner* — Amare F Tabor
(74) *Attorney, Agent, or Firm* — Okamoto & Benedicto LLP (57) ABSTRACT

In one embodiment, a network security appliance includes a logic circuit, a network processing unit, and a general purpose processor to protect a computer network from malicious codes, unauthorized data packets, and other network security threats. The logic circuit may include one or more programmable logic devices configured to scan incoming data packets at different layers of a multi-layer protocol, such as the OSI-seven layer model. The network processing unit may work in conjunction with the logic circuit to perform protocol parsing, to form higher layer data units from the data packets, and other network communications-related tasks. The general purpose processor may execute software for performing functions not available from the logic circuit or the network processing unit. For example, the general purpose processor may remove malicious code from infected data or perform malicious code scanning on data when the logic circuit is not configured to do so.

16 Claims, 7 Drawing Sheets

METHOD AND APPARATUS FOR SECURING A COMPUTER NETWORK BY MULTI-LAYER PROTOCOL SCANNING

CROSS-REFERENCE TO RELATED APPLICATION

This application claims the benefit of U.S. Provisional Application No. 60/660,751, filed on Mar. 11, 2005, which is incorporated herein by reference in its entirety.

BACKGROUND OF THE INVENTION

1. Field of the Invention

The present invention relates generally to computer systems, and more particularly but not exclusively to computer network security.

2. Description of the Background Art

As is well known, computers may communicate with one another over a computer network. For example, a company, organization, or household may have a private computer network for file storage, working on collaborative projects, sharing computer resources, and other network-related activities. Computers in a private computer network may also communicate with other computers outside the private computer network. For example, a private computer network may be coupled to the Internet to allow computers in the private computer network to receive e-mails, files, and other data from external computers. Coupling a private computer network to the Internet, however, exposes the private computer network to security threats. Such network security threats include malicious codes (e.g., virus, worm, Trojans, spywares, phish wares), unsolicited information (e.g., spam), and unauthorized intrusions by hackers.

Private computer networks may be defended against network security threats by performing firewall and antivirus functions at gateways or other network entry points. However, because of the high rate at which data pass through a network entry point, network security-related functions must also be performed relatively fast. Otherwise, these network security-related functions become a bottleneck and degrade network performance. Conventional approaches to network security typically sacrifice thoroughness for speed or vice versa. For example, a network security apparatus may limit the amount of malicious code scanning to improve data transfer rates.

Therefore, there is a need for a network security method and apparatus that provide relatively thorough network security functions while minimizing impact on data transfer rates across the network.

SUMMARY

In one embodiment, a network security appliance includes a logic circuit, a network processing unit, and a general purpose processor to protect a computer network from malicious codes, unauthorized data packets, and other network security threats. The logic circuit may include one or more programmable logic devices configured to scan incoming data packets at different layers of a multi-layer computer network communication protocol, such as the OSI seven-layer model. The network processing unit may work in conjunction with the logic circuit to perform protocol parsing, to form higher layer data units from the data packets, and other network communications-related tasks. The general purpose processor may execute software for performing functions not available from the logic circuit or the network processing unit. For example, the general purpose processor may remove malicious code from infected data or perform malicious code scanning on data when the logic circuit is not configured to do so.

These and other features of the present invention will be readily apparent to persons of ordinary skill in the art upon reading the entirety of this disclosure, which includes the accompanying drawings and claims.

DESCRIPTION OF THE DRAWINGS

FIG. 6, which consists of FIGS. 6A and 6B, schematically illustrates further details of the network security appliance of FIG. 5 in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
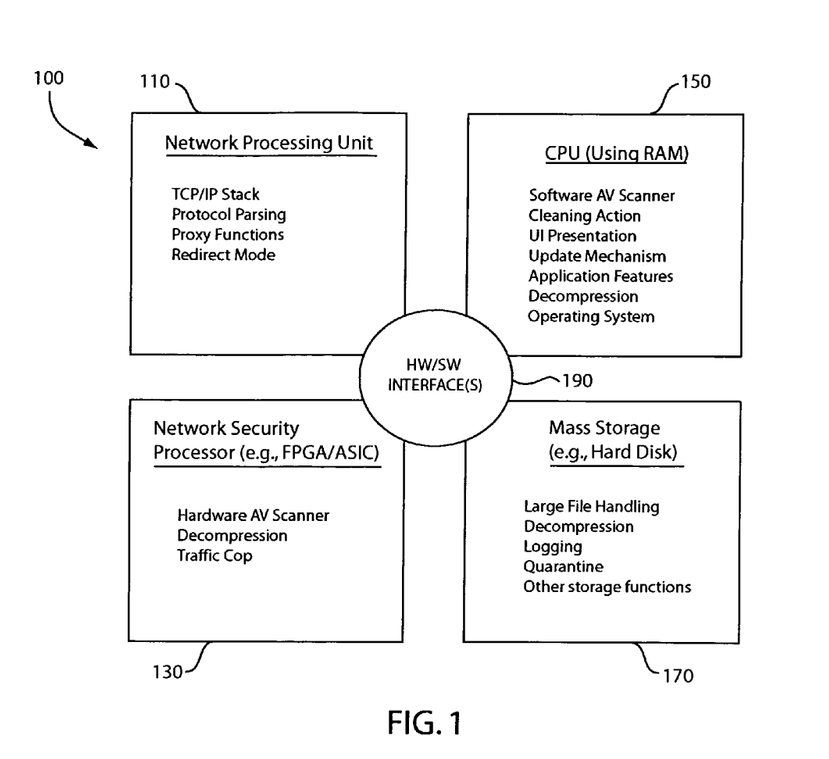
FIG. 1 shows a functional diagram of a network security appliance in accordance with an embodiment of the present invention.

FIG. 1 shows a functional diagram of a network security appliance 100 in accordance with an embodiment of the present invention. In the example of FIG. 1, the network security appliance 100 includes a network processing unit (NPU) 110, a network security processor 130, a central processing (CPU) 150, and a mass storage device 170. The components of the network security appliance 100 may be coupled by hardware and software interfaces 190. The network security appliance 100 divides network security-related tasks among its hardware-based and software-based components to advantageously protect a computer network from external attacks while minimizing impact on data transfer rates through the appliance. The network security appliance 100 advantageously allows for relatively fast and early detection/suppression of network security threats.

The network security appliance 100 may be configured to receive incoming data that conform to a network communication protocol. For example, the network security appliance 100 may receive incoming packets conforming to a multi-layer computer network communication protocol, such as the Open System Interconnect (OSI) seven-layer model. As is well known, the OSI seven-layer model uses what is referred to as the "OSI protocol stack." As is well known, the OSI protocol stack has seven layers with the physical layer on layer 1, the data link layer on layer 2, the network layer on layer 3, the transport layer on layer 4, the session layer on layer 5, the presentation layer on layer 6, and the application layer on layer 7. In the OSI protocol stack, layer 1 is the lowest layer and layer 7 is the highest. The network security appliance 100 may be configured to scan incoming data for malicious code at various layers of the OSI protocol stack using hardware-based scanners for improved throughput.

Still referring to FIG. 1, the NPU 110 may comprise a special-purpose processor optimized to perform network communication-related tasks, such as TCP and UDP stream extraction, protocol parsing (e.g., HTTP, ICAP, SMTP, FTP), address determination, and formation of higher level data units (e.g., from layer 2 up to layer 7 of the OSI protocol stack) from the incoming data. Optionally, the NPU 110 may also be configured to perform proxy functions (including transparent proxy) and redirection and routing of packets. The NPU 110 may comprise a commercially available network processor, such as those available from the Intel Corporation, and associated program code.

The network security processor 130 may comprise a hardware-based scanner that includes circuitry configured to scan incoming data for network security threats, such as malicious codes, for example. In contrast to software-based scanners, such as antivirus software available for desktop and server computers, the network security processor 130 takes advantage of the inherent speed advantage of hardware implementations compared to software implementations, and a network security appliance architecture that allows for parallel and piplelined scanning at different layers of a multi-layer computer network communication protocol. Optionally, the network security processor 130 may also be configured to decompress archived files and to route (i.e., "traffic cop" function) incoming data to different components of the network security appliance 100. In one embodiment, the network security processor 130 comprises one or more programmable logic circuitry, such as field programmable gate arrays (FPGA), and associated program code. The network security processor 130 may also comprise application specific integrated circuits (ASIC), for example.

The CPU 150 may comprise a general purpose processor running program code resident in memory, such as random access memory (RAM). In one embodiment, the CPU 150 comprises an Intel Pentium® processor. The CPU 150 may run a software-based protocol parser or scanner to complement/supplement the network processing unit 110 or network security processor 130. For example, the CPU 150 may be configured to run antivirus software on data in the event the network security processor 130 is incapable of doing so, such as when the network security processor 130 has not been configured to scan a particular type of file. Although scanning by the CPU 150 will be slower compared to the network security processor 130, this advantageously allows the CPU 150 to provide network security-related functionalities not present in the network security processor 130, thereby allowing for a more thorough check for malicious code. The CPU 150 may also be configured to perform protocol parsing functions not performed by the network processing unit 110 because the network processing unit 110 is too slow to parse a particular protocol or because the particular protocol is rarely present in the network that its parsing is more efficiently implemented in the CPU 150.

The CPU 150 may run software configured to perform a predetermined action in the event the network security processor 130 or the software-based scanner finds malicious code in data received by the network security appliance 100. The predetermined action may comprise a cleaning action, such as removal of found malicious code from the data, putting the data in quarantine, informing a systems administrator or intended recipient about the malicious code, logging the discovery of the malicious code, and other actions. These cleaning actions may be similar to those performed by commercially available antivirus software.

As will be more apparent below, the network security processor 130 may include volatile or non-volatile memory for storing configuration information and patterns of known viruses and worms. Likewise, antivirus software run by the CPU 150 may employ memory or the mass storage 170 to access pattern files for malicious code scanning. Accordingly, the CPU 150 may run software configured to receive updated pattern files for malicious code scanning by the antivirus software and/or the network security processor 130. The CPU 150 may also run software configured to receive updated program code for the NPU 110 and the network security processor 130. These updates may be received by a computer including the CPU 150 over a public computer network, such as the Internet.

Some viruses are transmitted over the Internet inside archived files to make the viruses harder to detect and remove. Accordingly, the CPU 150 may run software configured to decompress archived files, such as ZIP and RAR files. The CPU 150 may also off-load decompression functions to the network security processor 130 to speed up the decompression process. For example, decompression algorithms conventionally performed by software run by a general purpose processor may be implemented in a programmable logic of the network security processor 130. Once an archived file is decompressed, individual files within the archive may be scanned by either the software-based scanner run by the CPU 150 or the hardware-based scanner of the network security processor 130.

The CPU 150 runs an operating system, such as the Microsoft Windows® or Linux operating system. The CPU 150 may also run application software that may or may not be related to network security, and a user interface for allowing users to interact with the network security appliance 100.

The mass storage 170 may be used in place of RAM for malicious code scanning, temporary storage, decompression of archived files, logging, quarantine of infected files, and other storage functions. The mass storage 170 may also be used as a ramdisk to increase memory size. The mass storage 170 and the CPU 150 may be part of a single-board computer system, for example. In one embodiment, mass storage 170 comprises hard disks. Mass storage 170 may also comprise non-volatile solid state memory, such as FLASH devices.

Figure 2:
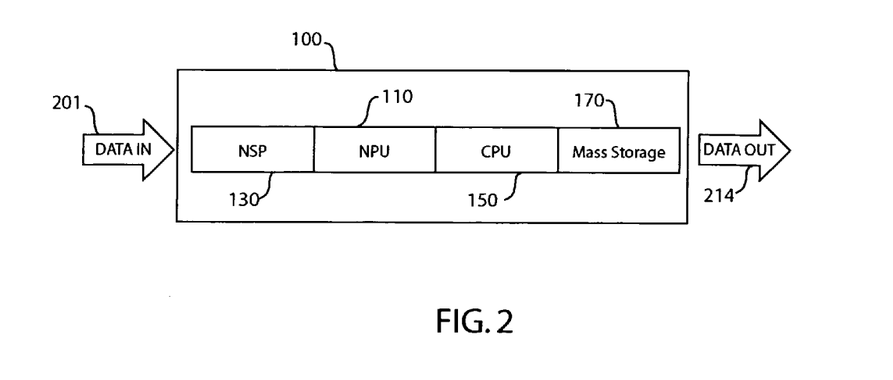
FIG. 2 schematically illustrates data flow through a network security appliance in accordance with an embodiment of the present invention.

FIG. 2 schematically illustrates data flow through the network security appliance 100 in accordance with an embodiment of the present invention. Note that FIG. 2 shows a sequential diagram for ease of discussion. As will be more apparent below, in practice, data may move through the network security appliance 100 in parallel and/or in a pipelined manner. Referring to FIG. 2, incoming data (arrow 201) may be received in the network security appliance 100 and forwarded out (arrow 214) after malicious code scanning and other network security checks. The incoming data may be received from a source external to the network security appliance 100. For example, the data may be received from a computer coupled to the network security appliance over the Internet. The network security processor 130 may employ circuitry to scan the data for malicious code for one or more scanning instances, the scanning instance being at different layers of a multi-layer network communication protocol stack. For example, the circuitry may scan the data at layer 2 of the OSI protocol stack at a first scanning instance, at layer 4 of the OSI protocol stack at a second scanning instance, and at layer 7 of the OSI protocol stack at a third scanning instance. If malicious code is detected in the data at any layer, the data and scanning results may be forwarded to the CPU 150 for predetermined action (e.g., cleaning of the data). The network security processor 130 may also serve as a "traffic cop" and direct traffic to other components of the network security appliance 100, such as the NPU 110 or the CPU 150.

The network security processor 130 forwards incoming data to the NPU 110 for protocol parsing and to form higher layer data units (e.g., TCP/IP stacking) from the data. For example, the NPU 110 may be employed to form layer 4 and layer 7 data. The NPU 110 sends formed higher layer data units back to the network security processor 130 for malicious code scanning.

The CPU 150, being a general-purpose processor, provides functionalities that may be missing in the network security processor 130 or the NPU 110. The CPU 150 may use RAM or the mass storage 170 to perform malicious code scanning, protocol parsing, decompression, or cleaning actions, for example.

It is to be noted that network security-related tasks, such as malicious code scanning and authorization scanning (e.g., checking for certain data packets that are prohibited from entering the private computer network), may be divided among the components of the network security appliance 100. For example, authorized incoming data that are free of malicious code may be processed by the network security processor 130 and the NPU 110 with minimal or no intervention from the CPU 150. By off-loading malicious code scanning to the network security processor 130 and the protocol parsing and stacking functions to the NPU 110, authorized, clean data may pass through the network security appliance 100 with minimal or no processing time from the CPU 150. As another example, incoming data found by the network security processor 130 to have malicious code at layer 2 of the OSI protocol stack does not need to be passed to the NPU 110 to form layer 4 or layer 7 data units.

Figure 3:
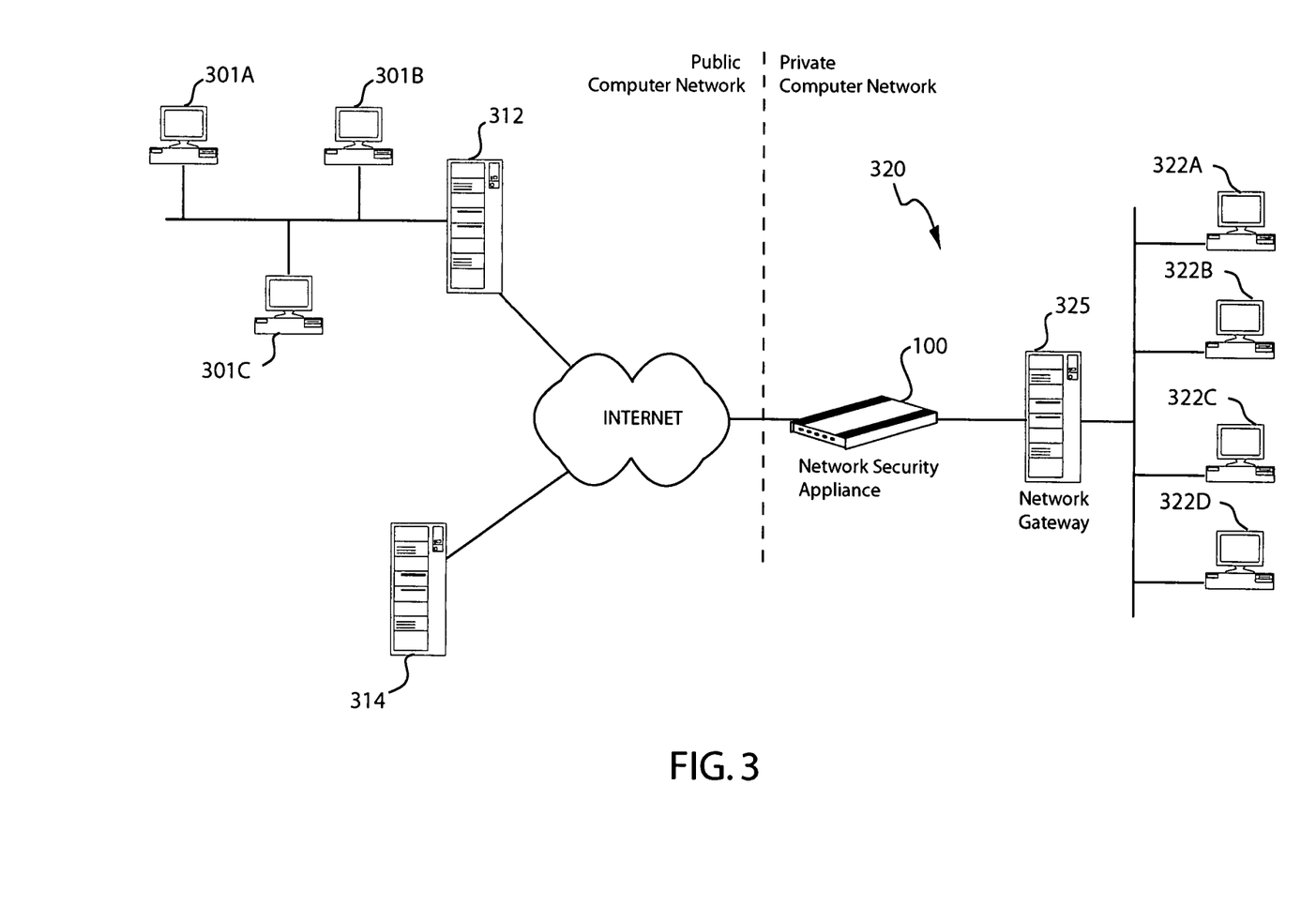
FIG. 3 shows a schematic diagram of a computing environment for a network security appliance in accordance with an embodiment of the present invention.

FIG. 3 shows a schematic diagram of a computing environment for a network security appliance 100 in accordance with an embodiment of the present invention. In the example of FIG. 3, the computing environment includes a private computer network 320 coupled to a public computer network comprising the Internet. As is well known, computers all over the world may be coupled to the Internet. For example, computers 312 and 314 may be server computers providing gateway, Internet access, or web services. As a further example, client computers 301 (i.e., 301A, 301B, 301C) may be part of another computer network coupled to the Internet by way of the server computer 312.

The private computer network 320 may include the network security appliance 100, network gateway 325, and client computers 322 (i.e., 322A, 322B, 322C, 322D). The client computers 322 may be desktop computers, while the network gateway 325 may be a server computer. The network gateway 325 may provide Internet access, e-mail, and/or file transfer services to the client computers 322. In the example of FIG. 3, the network security appliance 100 is deployed at an entry point of the private computer network 320. That is, in the example of FIG. 3, the network security appliance 100 is deployed as a gatekeeper between the private computer network 320 and the public computer network. The network security appliance 100 is thus in a position to screen data going to or leaving the private computer network 320. In other embodiments, the network security appliance 100 is deployed within the private computer network 320. For example, the network security appliance 100 may also be deployed within the private computer network 320 between the network gateway 325 and the client computers 322.

The network security appliance 100 is an "appliance" in that it is a stand-alone apparatus designed primarily for network security. This allows the network security appliance 100 to be optimized for its intended function. This also allows the network security appliance 100 to be physically separated from servers, such as the network gateway 325, thereby making the appliance more robust against external attacks. That is, an attack taking advantage of a vulnerability of an application running on a server cannot easily penetrate the network security appliance 100. Furthermore, using appliance architecture allows the networks security appliance 100 to be deployed separately, and often times transparently, from other computers on the private computer network 320.

Figure 4:
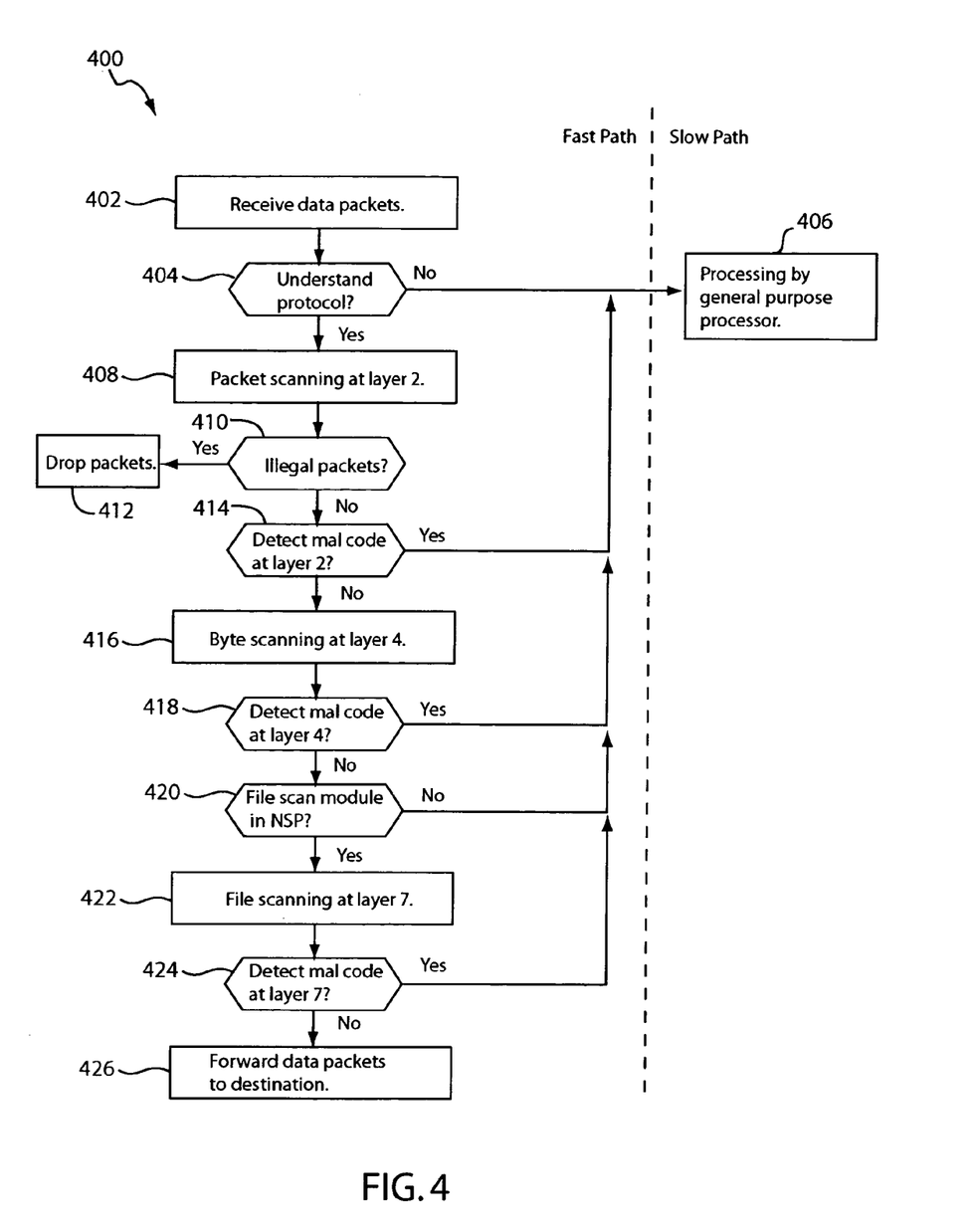
FIG. 4 is shows a flow diagram of a method of securing a computer network in accordance with an embodiment of the invention.

Referring now to FIG. 4, there is shown a flow diagram of a method 400 of securing a computer network in accordance with an embodiment of the present invention. The method 400 will be explained using the network security appliance 100 as an example. It is to be noted, however, that other network security apparatus may also be employed to perform the method 400. Furthermore, the method 400 will be explained in the context of data transmitted or received in accordance with the OSI seven-layer model for purposes of illustration only, not limitation.

In the example of FIG. 4, the method 400 has a "fast path" and a "slow path." The fast path includes network security-related steps performed by the network security processor 130 and the NPU 110, while the slow path includes steps performed by a general purpose processor, such as the CPU 150. The fast path takes advantage of the speed of special-purpose processors, such as the network security processor 130 and the NPU 110, to perform network security-related tasks at a relatively fast rate. The slow path with its use of general purpose processors, such as the CPU 150, complements the fast path by performing tasks not implemented by components in the fast path. The use of both fast and slow paths advantageously provides relatively thorough network security functions while minimizing impact on data transfer rate across the private computer network.

Note that the steps of the method 400 are shown in sequential fashion for illustration purposes only. The steps of the method 400, particularly the scanning and protocol determination steps, may be performed in parallel and without waiting for previous steps to finish.

Referring to FIG. 4, the method 400 begins with data packets being received in the network security appliance 100 (402). Copies of the data packets may be stored in memory within the network security appliance 100 so that the data packets can be readily forwarded to their destination in the event they do not contain malicious code. In the network security appliance 100, the data packets are received by the network security processor 130, and then forwarded to the NPU 110 for protocol parsing. The NPU 110 checks the data packets to see if they have been transmitted in accordance with a protocol supported by the NPU 110. If not, the NPU 110 forwards the data packets to the CPU 150 (steps 404 to 406). The CPU 150 may then perform software-based protocol parsing, TCP/IP stacking, malicious code scanning and other tasks to determine whether the data packets contain malicious code and/or authorized to be transmitted over the private computer network 320 (see FIG. 3).

The network security processor 130 scans the data packets at layer 2 of the OSI protocol stack (step 408). That is, the network security processor 130 may scan the data packets in the form the data packets are originally received in the network security appliance 100. The network security processor 130 may scan the data packets to determine if they are authorized to be transmitted over the private computer network 320 (step 410). For example, the network security processor 130 may examine the headers of the packets to determine if they are coming from a prohibited computer and hence illegal. The network security processor 130 may also learn from the CPU 150 if the data packets conform to a protocol prohibited from entering the private computer network 320 (e.g., in the event of a virus outbreak in SMTP transfers, SMTP packets may be temporarily blocked from entering the private computer network 320). The data packets may be dropped or prevented from entering the private computer network 320 if they are found to be illegal (step 412). Other actions may also be performed in the event the data packets are not authorized to be transmitted over the private computer network 320.

The network security processor 130 scans the data packets for malicious code at layer 2, (step 414). For example, the network security processor 130 may compare the contents of the data packets to patterns of known viruses, worms, Trojans and other malicious codes. The patterns of known malicious codes at different layers of the OSI protocol stack may be stored in volatile or non-volatile memory accessible to the network security processor 130. If the data packets contain malicious code, the data packets may be dropped or forwarded to the CPU 150 (step 414 to step 406) or the NPU 110. The CPU 150 may assemble the data packets into a file, then clean or quarantine the file, for example. The CPU 150 may also perform other actions in the event the network security processor 130 finds malicious code in the data packets, including updating a log, alerting the system administrator, and so on.

The network security processor 130 sends the data packets to the NPU 110 where the data packets are formed into layer 4 data units. The network security processor 130 then scans the layer 4 data units for malicious code (step 416). Malicious code scanning at layer 4 is also referred to as "byte scanning" because the layer 4 data units may be compared to patterns of known malicious codes at layer 4 byte by byte. As before, the data packets (or higher layer data units formed from the data packets) and the results of the byte scanning may be forwarded to the CPU 150 in the event malicious code is found (step 418 to step 406).

The NPU 110 processes the layer 4 data units by performing protocol parsing and forming layer 7 data units. The layer 7 data units may comprise a file, for example. If the network security processor 130 is not capable of scanning the file (e.g., does not have a scanner for the particular file type), the file may be forwarded to the CPU 150 for scanning using a software-based scanner (e.g., antivirus software) (step 420 to step 406). Otherwise, the NPU 110 forwards the file to the network security processor 130 where the file is scanned for malicious codes (i.e. layer 7 scanning) (step 422). The file and the results of the file scanning may be forwarded to the CPU 150 in the event malicious code is found (step 424 to step 406).

If the data packets do not contain malicious code and are authorized to be transmitted over the private computer network 320, the data packets are forwarded to their destination address (step 426), which may be the network gateway 325 or other computer in the network. Note that in this case, the data packets advantageously pass through the network security appliance 100 through the fast path.

Figure 5:
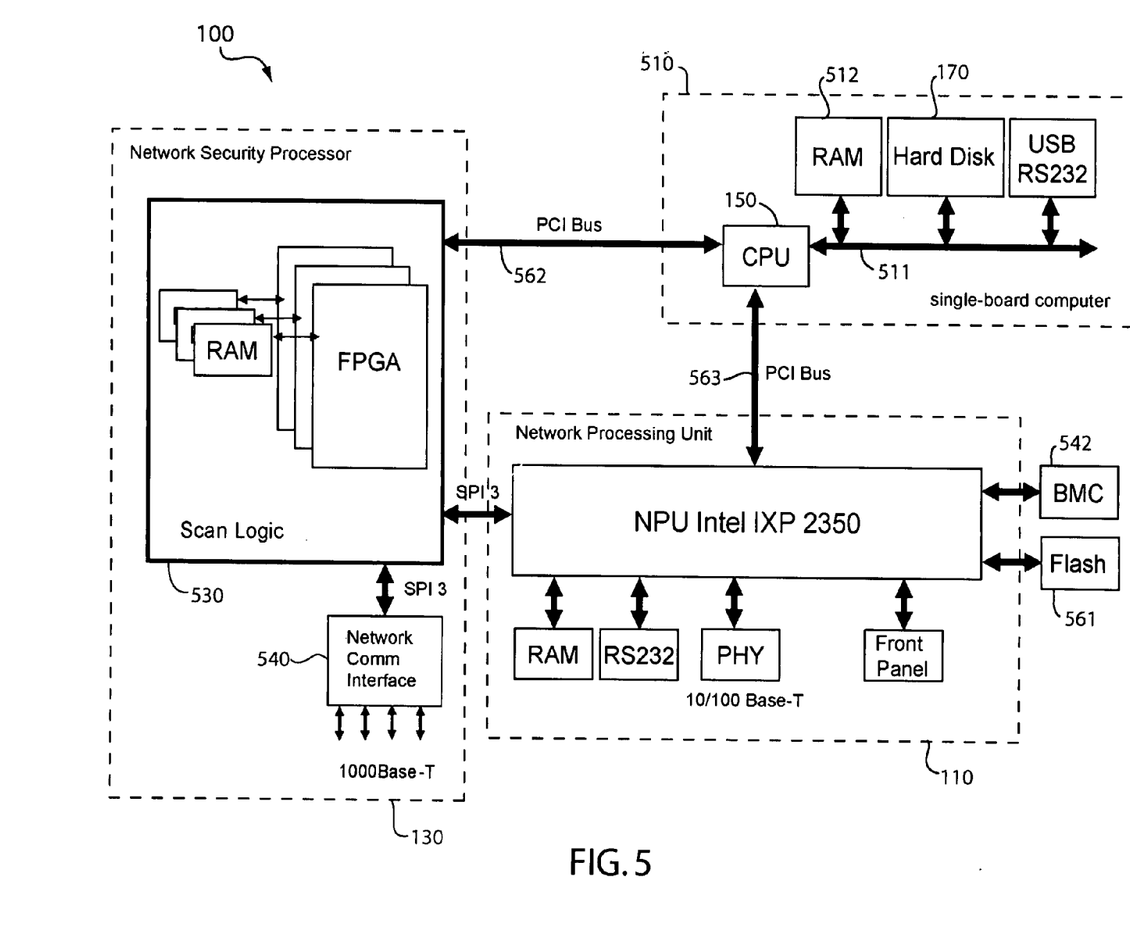
FIG. 5 schematically illustrates further details of a network security appliance in accordance with an embodiment of the present invention.

FIG. 5 schematically illustrates further details of a network security appliance 100 in accordance with an embodiment of the present invention. In the example of FIG. 5, the CPU 150, the mass storage device 170, and associated memory (e.g., RAM 512) are components of a single-board computer 510. One or more buses 511 couple the CPU 150, the RAM 512, the mass storage device 170, and other components of the computer 510. The computer 510 may include an interface to one or more PCI buses, which are labeled as PCI buses 562 and 563 in FIG. 5. The NPU 110, the network security processor 130, and the CPU 150 may communicate over the PCI buses. In the example of FIG. 5, the network security processor 130 communicates with the CPU 150 over the PCI bus 562, which may comprise a 64 bit/100 MHz or 133 MHz PCI-X bus, for example. Similarly, the NPU 110 may communicate with the CPU 150 over the PCI bus 563, which may comprise a 64 bit/66 MHz PCI bus, for example. As is well understood, the designation "PCI bus" includes standard PCI as well as variations thereof, such as PCI-X and PCI-E. Computer buses other than PCI may also be used to couple the just mentioned components of the network security appliance 100.

The NPU 110 may comprise a network processor configured to perform network communication-related processing, such as protocol parsing, stream extraction, and TCP/IP stacking. The NPU 110 may have (a) internal memory (RAM in the example of FIG. 5) for storing program code and configuration information; (b) a serial interface port (e.g., RS-232) for communicating with a terminal, printer, or other serial device; (c) an unprotected Ethernet port for communicating with the network security appliance 100 for management purposes; (d) additional network interfaces; and (e) front panel interfaces. The NPU 110 may communicate with board monitoring and control (BMC) circuits 542 to monitor power supply levels, fan operation, and the like in the network security appliance 100. A non-volatile memory 561, which comprises FLASH memory in the example of FIG. 5, allows for storage of configuration data and programming code. In the example of FIG. 5, the NPU 110 comprises an Intel® IXP 2350 network processor chip.

In the example of FIG. 5, the network security processor 130 comprises a network communications interface 540 and a hardware-based scanner in the form of scan logic 530 and associated memory for storing program code and pattern files, for example. The scan logic 530 may be configured to scan network data at various layers of the OSI protocol stack. The scan logic 530 may comprise one or more FPGA's, for example.

The communications interface 540 may comprise a network interface having a plurality of ports for coupling the network security appliance 100 to the private computer network 320 and the Internet, for example. Incoming data packets may be received over the Internet by way of the network communications interface 540. Similarly, scanned data packets may be forwarded to their destinations within the private computer network 320 by way of the network communications interface 540. The network communications interface 540 may forward incoming data packets to the scan logic 530. In one embodiment, the network communications interface 540 communicates with the scan logic 530 over a bus conforming to the System Packet Interface Level 3 (SPI-3) protocol. Other packet interface protocols may also be used.

In one embodiment, the scan logic 530 comprises programmable logic configured to perform malicious code scanning of data at layers 2, 4, and 7 of the OSI protocol stack. The scan logic 530 may also be configured to act as a "traffic cop" to direct data to other components of the network security appliance 100. For example, the scan logic 530 may direct data from the network communications interface 540 to the NPU 110 for protocol parsing or to form higher layer data units. As another example, the scan logic 530 may direct data from the CPU 150 for protocol parsing not supported in the NPU 110 and file scanning (i.e., malicious code scanning at layer 7). The scan logic 530 and the NPU 110 may communicate over an SPI-3 bus, for example.

It is to be noted that the mechanics of configuring programmable logic, in general, is known in the art and not further described here. Manufacturers of programmable logic devices provide programming manuals and design software for configuring their particular programmable logic. In one embodiment, the scan logic 530 is configured to perform known antivirus scanning algorithms typically implemented in purely software-based commercially-available antivirus products for scanning data for viruses, worms, and other malicious codes.

Figures 6, 6A:
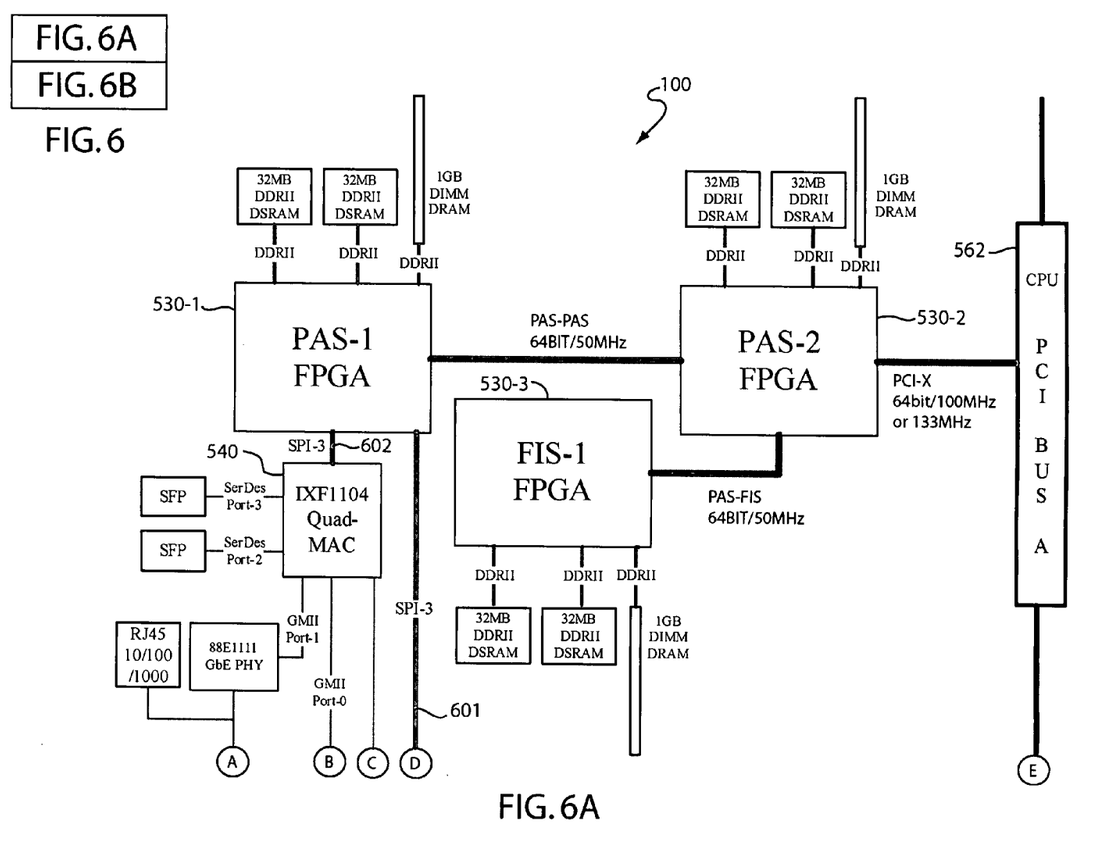
Figure 6B:
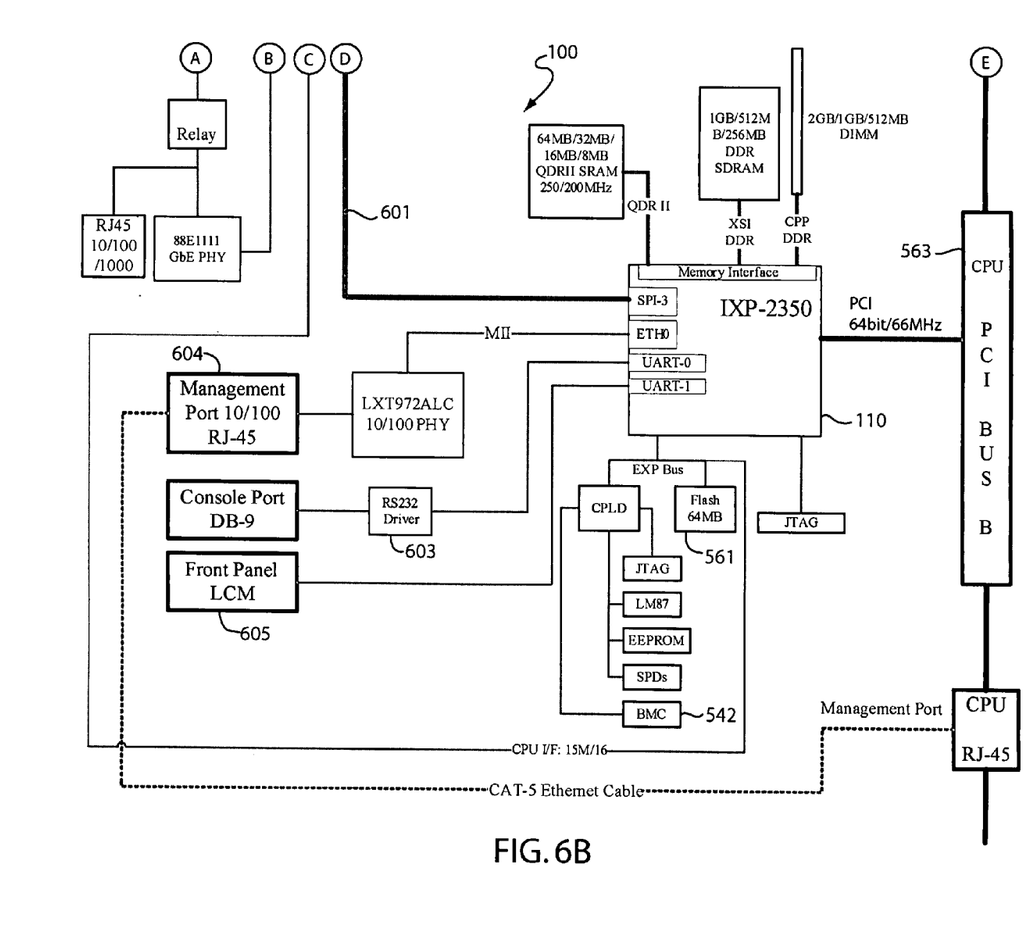

FIG. 6, which consists of FIGS. 6A and 6B, schematically illustrates further details of the network security appliance 100 of FIG. 5 in accordance with an embodiment of the present invention. The NPU 110 (see FIG. 6B) may comprise a commercially available network processor, such as the Intel® IXP2350 network processor, for example. In the example of FIG. 6, the NPU 110 includes a memory interface for accessing a variety of memory modules including SRAM and DIMM modules. Configuration and program code of the NPU 110 may be stored in the non-volatile memory 561, which may comprise 64 MB FLASH memory. The NPU 110 may include interfaces to an external bus for coupling to the memory 561 and support logic, such as a complex programmable logic device (CPLD) configured to allow access to the board monitoring control circuits 542 and other circuits. The NPU 110 may also include communication interfaces, such as universal asynchronous receiver transmitter (UART) and Ethernet ports, for example. The NPU 110 may communicate with the scan logic 530 over a SPI-3 bus, for example.

The single board computer 510 may comprise an Intel® Pentium 4/Xeon® CPU card communicating with the NPU 110 over the PCI bus 563 and with the scan logic 530 over the PCI bus 562.

In one embodiment, the scan logic 530 (see FIG. 6A) comprises one or more commercially available programmable logic devices, such as those available from Xilinx or Altera, for example. In the example of FIG. 6, the scan logic 530 comprises three FPGA's, labeled as 530-1, 530-2, and 530-3. The FPGA's 530-1, 530-2, and 530-3 may access pattern files, program codes, and other data from associated memory. The FPGA's 530-1 and 530-2 may be configured to scan data at layers 2 and 4 of the OSI protocol stack, while the FPGA 530-3 may be configured to scan data at layer 7. The FPGA's 530-1, 530-2, and 530-3 may employ conventional data scanning algorithms. The FPGA 530-1 may be configured as a traffic cop to interface with the NPU 110 over an SPI-3 bus 601 and with the network communication interface 540 over an SPI-3 bus 602.

In one embodiment, the network communications interface 540 (see FIG. 6A) comprises a commercially available media access control (MAC) chip, such as the Intel® IXF1104 4-port gigabit Ethernet MAC chip. Other components of the network security appliance 100 shown in FIG. 6 include: (a) console connection to the NPU 110 by way of an RS-232 driver 603; (b) unprotected network connection to the NPU 110 by way of an RJ45 port 604; (c) front panel interface 605 coupled to the NPU 110; and (d) JTAG logic for testing the network security appliance during manufacture.

Figure 7:
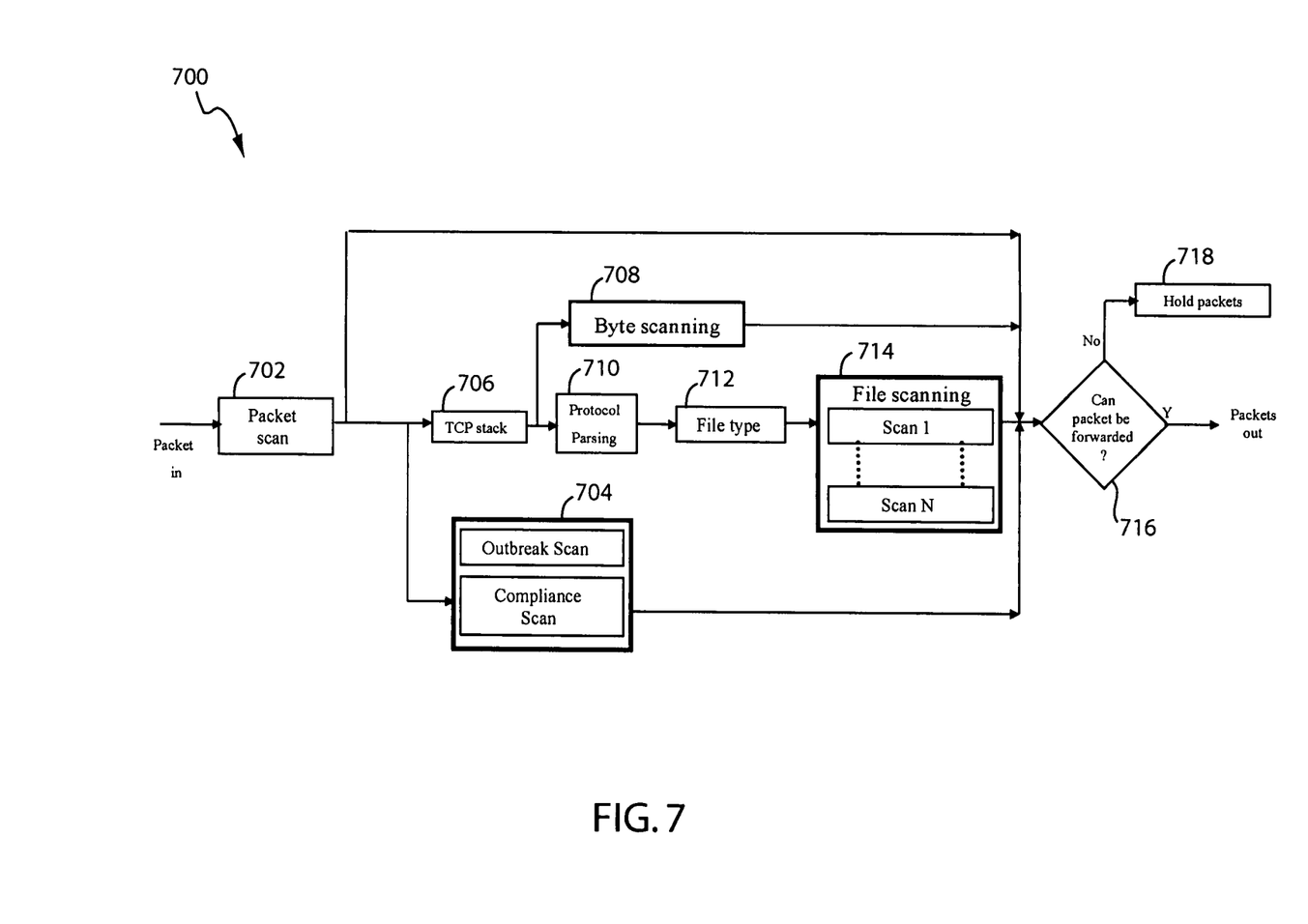
FIG. 7 shows a flow diagram of a method of securing a computer network in accordance with an embodiment of the present invention.

FIG. 7 shows a flow diagram of a method 700 of securing a computer network in accordance with an embodiment of the present invention. Method 700 will be explained using a network security appliance 100 (see FIG. 5) and incoming data conforming to the OSI seven-layer model for illustration purposes only, not limitation.

Method 700 begins with incoming data packets entering the network security appliance 100 through the network communications interface 540. In step 702, the scan logic 530 scans the data packets at layer 2 of the OSI protocol stack (i.e., in packet form as first received by the network security appliance 100) to check if the data packets contain malicious code or other network security threat. To check for malicious code, the scan logic 530 may compare the contents of the data packets to patterns of known malicious codes. For example, the scan logic 530 may check the headers of the packets or their payloads to identify patterns indicative of malicious code. The scan logic 530 may also use other known antivirus algorithms, such as regular expressions, to detect malicious codes without detracting from the merits of the present invention.

In step 704, the incoming data packets are scanned at layer 2 of the OSI protocol stack to determine if they are authorized (i.e., legal packets) to enter the private computer network secured by the network security appliance 100. To determine if the data packets are authorized or not, the scan logic 530 may perform an authorization scan, which may include a compliance scan and an outbreak scan. A compliance scan involves determining if the data packets comply with network policies, which may be set by a network administrator. For example, the network administrator may set a policy blocking all data packets going to or coming from prohibited computers. The addresses of the prohibited computers may be stored in a table in a RAM accessible to the scan logic 530. In that case, the scan logic 530 may read the headers of the incoming data packets to determine their destination and sender addresses, and compare the addresses to those listed in the table.

An outbreak scan involves determining if the data packets are of the type likely to contain malicious code currently spreading through computer networks. For example, in the case of an outbreak of a particular virus, the network security appliance 100 may be configured to be especially diligent in looking for that particular virus. In that case, the scan logic 530 may check the contents of the data packets to determine if it is likely to follow a protocol, a file, etc. used by that particular virus. Note that an outbreak scan may be performed at layers 2, 4, or 7 of the OSI protocol stack depending on the outbreak. Depending on implementation, the NPU 110 may also be used to perform an outbreak scan.

In step 706, the NPU 110 extracts layer 4 data from the data packets. The NPU 110 then forwards the layer 4 data to the scan logic 530.

In step 708, the scan logic 530 performs byte scanning on the layer 4 data to check them for malicious code that may be detectable only at layer 4 of the OSI protocol stack.

In step 710, the NPU 110 performs protocol parsing on the layer 4 data to extract layer 7 data.

In step 712, the scan logic 530 determines the type of file (e.g., executable, text, script, graphics, etc.) formed by the layer 7 data, if any.

In step 714, the scan logic 530 performs file scanning on the layer 7 data to check for malicious codes. The scan logic 530 may employ any known an antivirus scanning algorithm appropriate for a particular file type without detracting from the merits of the present invention.

In step 718, the data packets are held for further processing (e.g. cleaning action) if they are illegal (see step 704) or contain malicious code at layer 2 (see step 702), layer 4 (see step 708), or layer 7 (see step 714) of the OSI protocol stack.

Otherwise, the data packets are transmitted out of the network security appliance 100 towards their destination by way of the network communications interface 540. Note that a copy of the data packets may be stored in volatile or non-volatile memory so that they may be readily forwarded out in the same form as originally received in the network security appliance 100. In step 718, the data packets may be forwarded to the CPU 150 for cleaning and/or logging, for example. Depending on implementation, the CPU 150 may clean, drop, quarantine, etc. data found to be illegal or infected with malicious code.

The unique architecture of the network security appliance 100 advantageously allows for parallel scanning of incoming data packets at various layers of a multi-layer computer network communication protocol. Using method 700 as an example, the packet scanning at layer 2 (step 702) may be performed without waiting for the results of the byte scanning at layer 4 (step 708) or file scanning at layer 7 (step 714). Similarly, byte scanning at layer 4 may be performed without waiting for the results of the packet scanning or file scanning, and so on. This way, the scanning time through the network security appliance 100 corresponds to the slowest scanning step. In other words, the scanning time is not necessarily the total scanning times of the packet, byte, and file scanning step. Rather, the scanning time may be roughly equal to the scanning time of the slowest scanning step. This advantageously allows for detection of network security threats early on without severely impacting data transmission rates through the network security appliance.

Improved methods and apparatus for securing a computer network have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of securing a computer network, the method comprising:
    receiving incoming data packets in a network security appliance, the network security appliance including a logic circuit configured to scan the data packets for malicious code;
    using the logic circuit to scan the data packets for malicious code;
    forming a higher layer data unit from the data packets using a network processing unit;
    using the logic circuit to scan the higher layer data unit for malicious code;
    forming the higher layer data unit into a next higher layer data unit using the network processing unit; and
    using the logic circuit to scan the next higher layer data unit for malicious code.

2. The method of claim 1 further comprising:
    if malicious code is not found in the data packets, higher layer data unit, and the next higher layer data unit, forwarding the data packets to a server computer coupled to the first apparatus over the computer network.

3. The method of claim 1 wherein the data packets is at a layer 2 of an Open Systems Interconnection (OSI) seven-layer model.

4. The method of claim 3 wherein the higher layer data unit is at layer 4 of an Open Systems Interconnection (OSI) seven-layer model.

5. The method of claim 1 wherein the next higher data unit comprises a file.

6. The method of claim 1 wherein the logic circuit comprises a first programmable logic configured to perform packet scanning and a second programmable logic configured to perform file scanning.

7. The method of claim 1 wherein the pre-determined action comprises removing the found malicious code.

8. The method of claim 1 further comprising:
    if malicious code is found in the data packets, the higher layer data unit, or the next higher layer data unit, using a software-based scanner run by a general purpose processor to perform a pre-determined action on the data packets.

9. A network security appliance comprising:
    a network security processor having circuitry configured to scan data packets and higher layer data units formed from the data packets for malicious code and to direct the data packets to other components of the network security appliance;
    a network processing unit coupled to the network security processor, the network processing unit being configured to form the data packets into higher layer data units; and
    a general purpose processor coupled to the network processing unit and the network security processor, the general purpose computer being configured to perform a predetermined action if the data packets contain malicious code.

10. The network security appliance of claim 9 wherein the network security processor comprises programmable logic.

11. The network security appliance of claim 9 wherein the network security processor comprises application specific integrated circuit (ASIC).

12. The network security appliance of claim 10 wherein the network security processor comprises a first logic circuit configured to scan the data packets for malicious code and a second logic circuit configured to scan higher layer data units formed from the data packets for malicious code.

13. A method of securing a computer network, the method comprising:
    receiving data that conform to a multi-layer networking communication protocol; and
    using logic circuitry to scan the data at different layers of the networking communication protocol for malicious code.

14. The method of claim 13 wherein the logic circuitry scans the data for malicious code at a first scanning instance and at a second scanning instance, the second scanning instance being performed without waiting for a result of the first scanning instance.

15. The method of claim 14 wherein the circuitry scans the data for malicious code at a third scanning instance, the third scanning instance being performed without waiting for a result of the second scanning instance or the first scanning instance.

16. The method of claim 15 wherein the networking communication protocol comprises an Open System Interconnect (OSI) seven-layer model, the first scanning instance including scanning of the data at layer 2 of an OSI protocol stack, the second scanning instance including scanning of the data at layer 4 of OSI protocol stack, and the third scanning instance including scanning of the data at layer 7 of the OSI protocol stack.

* * * * *

UNITED STATES PATENT AND TRADEMARK OFFICE
CERTIFICATE OF CORRECTION

| | | |
|---|---|---|
| PATENT NO. | : 8,656,488 B2 | Page 1 of 1 |
| APPLICATION NO. | : 11/366305 | |
| DATED | : February 18, 2014 | |
| INVENTOR(S) | : Liang et al. | |

It is certified that error appears in the above-identified patent and that said Letters Patent is hereby corrected as shown below:

In the Claims:

on claim 2, column 11, line 58, before "first apparatus", delete "the" and replace it with,
-- a -- on claim 5, column 12, line 1, after "next higher" and before "data unit" insert,
-- layer -- on claim 9, column 12, line 26, delete "computer" and replace it with,
-- processor -- on claim 16, column 12, line 61, after "layer 4 of" and before "OSI protocol stack" insert,
-- the --

Signed and Sealed this
Third Day of June, 2014

Michelle K. Lee
*Deputy Director of the United States Patent and Trademark Office*